United States Patent [19]

Ruprecht

[11] Patent Number: 5,543,997

[45] Date of Patent: Aug. 6, 1996

[54] SAFETY SWITCHING SYSTEM FOR A WORKING APPARATUS

[75] Inventor: Harald Ruprecht, Waldkirch, Germany

[73] Assignee: Erwin Sick GmbH, Optik-Elektronik, Waldkirch/Breisgau, Germany

[21] Appl. No.: 166,751

[22] Filed: Dec. 15, 1993

[30] Foreign Application Priority Data

Dec. 17, 1992 [DE] Germany .......................... 42 42 792.4

[51] Int. Cl.$^6$ ................................................... H02H 3/00
[52] U.S. Cl. ........................ 361/93; 361/187; 307/113; 307/141.8; 324/523; 340/644; 340/687; 340/825.18
[58] Field of Search .................. 361/1, 3, 5, 6, 361/7, 93, 160, 166, 170, 190, 191, 187, 189; 307/113, 132 R, 132 E, 132 EA, 141.8; 324/415, 418, 422–424, 511, 523; 340/635, 639, 644, 651, 653, 687, 825.18

[56] References Cited

U.S. PATENT DOCUMENTS

| 5,243,336 | 9/1993 | Moonan et al. | 340/825.18 |
|---|---|---|---|
| 5,262,676 | 11/1993 | Blümel et al. | 307/10.1 |

FOREIGN PATENT DOCUMENTS

| 2447123 | 4/1976 | Germany . |
|---|---|---|
| 2831089C2 | 1/1980 | Germany . |
| 3135888C2 | 3/1983 | Germany . |
| 3732718A1 | 4/1989 | Germany . |
| 3734431A1 | 4/1989 | Germany . |
| 3921329A1 | 1/1991 | Germany . |
| 4112626A1 | 10/1992 | Germany . |

OTHER PUBLICATIONS

Janning, Wolfgang, "Zweikanalige Pressensicherheitssteuerung mit einem speicherprogrammierbaren Steurungssystem", VDI-Z (1980) No. 1/2. pp. 17–20 no month.

Primary Examiner—Jeffrey A. Gaffin
Assistant Examiner—Ronald W. Leja
Attorney, Agent, or Firm—Townsend and Townsend and Crew LLP

[57] ABSTRACT

A safety switching arrangement for the switching on and off of the power supply (11) of two actors (12a, 12b) for example relays, which, in dependence on the switching on of the current, and in dependence on a sensor switching signal (13a, 13b) jointly set a working apparatus (22) in operation, the safety switching arrangement comprising two main switches (14a, 14b) arranged between the power supply (11) and each preferably earthed actor (12a, 12b). In each case a controllable normally closed auxiliary switch (16a, 16b) is arranged between the sensor signal input (15a, 15b) and the main switches (14a, 14b) and, with the main switch (14a, 14b) closed by the application of a sensor closing signal, is briefly opened by a test generator (45) to provide a test pause via a first control input (19a, 19b) at regular time intervals offset timewise to the other respective auxiliary switch (16b, 16a) so that, in each case, the brief opening of the associated main switch (14a, 14b) brought about—in the troublefree state of the associated switch (14a, 14b)—is not sufficient as a result of the inertia of the actors (12a, 12b) to set the attached working apparatus (22) out of operation. A test circuit (18a, 18b; 21a, 21b, 24a, 24b; 27a, 27b; 36a, 36b) is provided which examines during the test pause whether the main switch (14a, 14b) associated with the respective auxiliary switch (16a, 16b) is also open. On non-opening of a main switch (14a, 14b) during the test pause, the other respective auxiliary switch (16b, 16a) is set into the open state and is permanently maintained in this state.

23 Claims, 3 Drawing Sheets

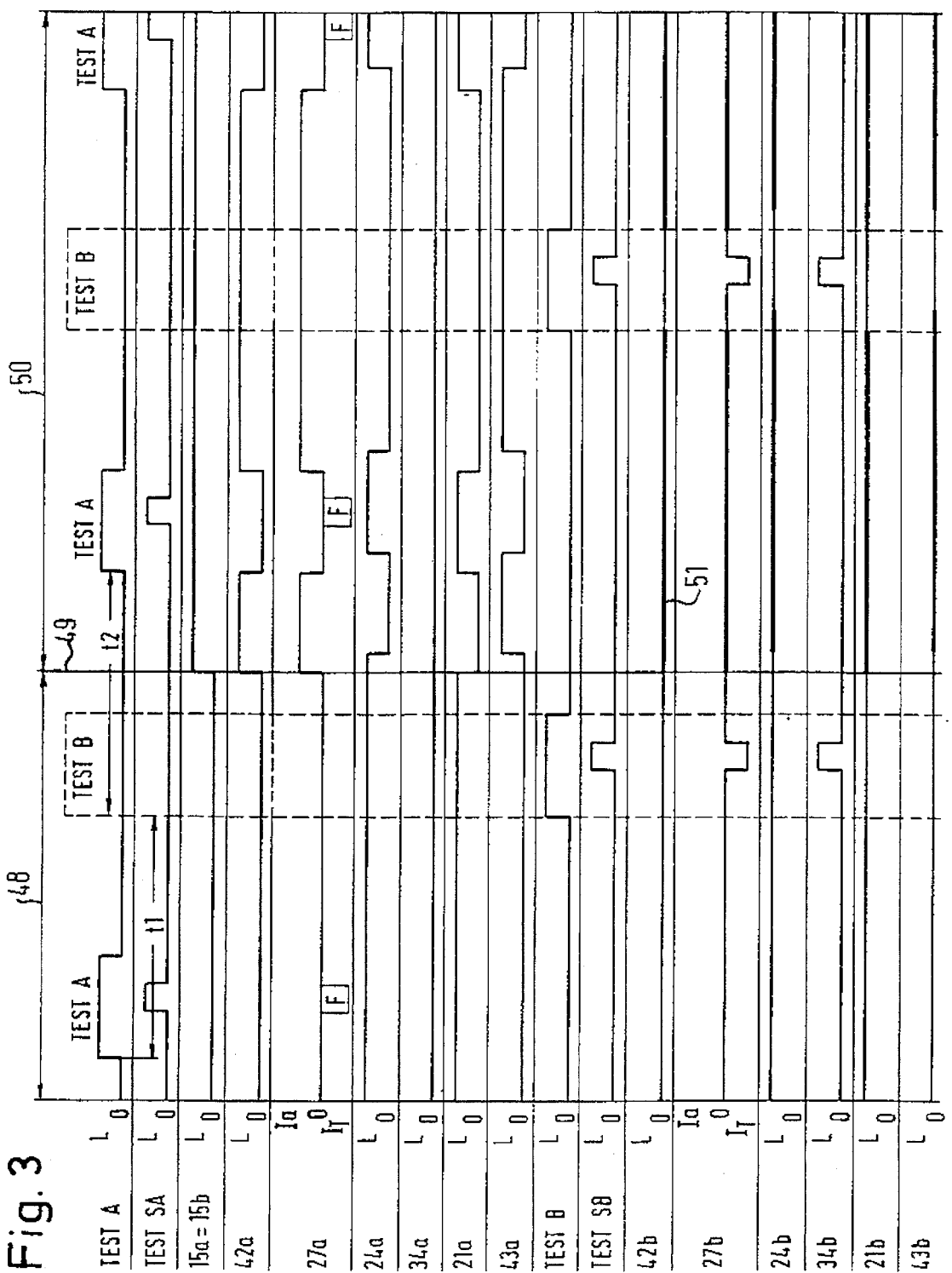

SAFETY SWITCHING SYSTEM FOR A WORKING APPARATUS

BACKGROUND OF THE INVENTION

The invention relates to a safety switching arrangement for the switching on and switching off of the power supply of two actors which jointly set a working apparatus in operation in dependence on the switching on of the current. The actors are preferably relays which jointly control the working apparatus in the sense that the working apparatus is only switched on when both actors are active. If one of the actors is inactive then the working apparatus is switched off. The working apparatus can for example be a dangerous working machine which is only in operation on activation of both actors, whereas it is brought into its non-dangerous preferably switched off position when one or both of the actors have become inactive.

It is already known (DE-PS 28 31 089) to provide at least two contact incorporating switching outputs between a sensor which is for example formed as a light barrier and a machine control, with the switching outputs being formed by at least two relays which can be switched off independently from one another and which preferably have compulsorily guided contacts. In this way a dangerous state detected by the sensor is converted into a stop command which is transmitted by opening of the switching outputs for the subsequent machine control. The machine control thereupon converts the controlled system from the endangering operating state into a switched off safe operating state in which the two switching outputs are open.

In the known safety switching arrangement, the safety is achieved by redundant execution of the switching path and in this way it is ensured that during the endangering state (switching on of the working apparatus) at most one switching off path looses the switching off function as a consequence of the fault which has arisen. Before each initiation of the endangering, switched-on, state of the machine of the working apparatus, the two switch-off paths can be checked to see that each indicates a safe operating state. If a fault is uncovered, for example a welded switching output or a short circuit in the connection lines from the switching output of the machine control, a latching circuit keeps the second fault-free switch-off path in a safety switching state independently of the sensor signal.

The known safety switching arrangement has the disadvantage that faults in the output circuit which arise during the continuous operation in each endangering state (switched on working apparatus) are not detected. Through an accumulation of faults the danger exists that the machine will not be converted into a safe operating state on the appearance of a stop signal from a sensor, i.e. will not be switched off. In particular it is disadvantageous that the examination of the switching-off paths does not take place automatically in a defined time interval, but rather must take place through administrative instructions to an operator.

Short circuits between connection lines to the machine control cannot be uncovered by the known solution. This fault situation can only be partly controlled by restrictive rules of use, which however stand partly in contradiction to technical rules.

Switches with contacts are subject to wear as consequence of which regular repair costs and machine downtimes arise.

Finally, mechanical contacts must be protected against burning away by arc formation on switching off inductive loads in order to ensure useful working lives for the contacts. In this way further costs and possible sources of faults arise.

SUMMARY OF THE INVENTION

The object of the present invention is to provide a safety switching arrangement of the initially named kind which, even with a switched on state of the working apparatus which endures as long as desired, i.e. with the dangerous switching state of the working apparatus of the machine lasting as long as desired, the immediate recognition of faults is ensured, in particular in the two main switches.

INSERT 1

The basic concept of the invention is thus to be seen in that the two main switches receive a brief opening signal at relatively short sequential time intervals; and that in the relevant test pause a check is automatically made by electronic monitoring means whether the switches are thereby actually opened or not. If non-opening is found for one of the main switches during the test pause then the other main switch is opened and measures are taken to ensure that this second main switch also remains open after the test pause. It is important that the test pauses are made so short that the actors cannot recognise this interruption because of their inertia and thus remain active up to the end of the test pause. Only when non-opening of one of the main switches is determined within the test pause is the other main switch open after the test pause when its inertia has been overcome, and remains in this open state until the fault which has arisen has been alleviated.

An advantageous embodiment which operates with an output current measuring stage. An output voltage measuring stage can however be provided either alternatively or for the provision of redundancy.

The provision of a low pass filter is expedient in order to avoid the entry and/or emergence of disturbing pulses at the output of the safety switching arrangement of the invention.

The suppressor diodes are expedient in order to avoid damage or destruction of the main switches by disturbing pulses which enter into the circuit from the output, for example through lightening strike.

In order to now also continuously check the suppressor diodes for trouble-free functioning, a test circuit may be provided to find interruptions in the suppressor diodes since through-alloying is already recognised by the first test circuit, since then the supply voltage passes through the suppressor diodes to the output line and is thus also present on opening of the associated main switch, which already leads via the first test circuit to the switching off of the other main switch. However, as already stated, an interruption of the suppressor diode or for example an interruption of one of its connections during the test pause is also additionally detected.

A test pause is expediently split up into two parts, whereby for example the same output current measuring stage can be used for the monitoring of the trouble-free functioning of the suppressor diodes.

Whereas the monitoring of the load current and the test pause is expediently effected in a first test pause section, the monitoring of the test current through the suppressor diode takes place in the second test pause section. All test signals are linked in the auxiliary switches via an "AND" logic, so that the relevant auxiliary switch then and only then remains closed after a test pause when no fault signal appears.

DESCRIPTION OF THE SPECIFIC EMBODIMENTS

Figure 1:
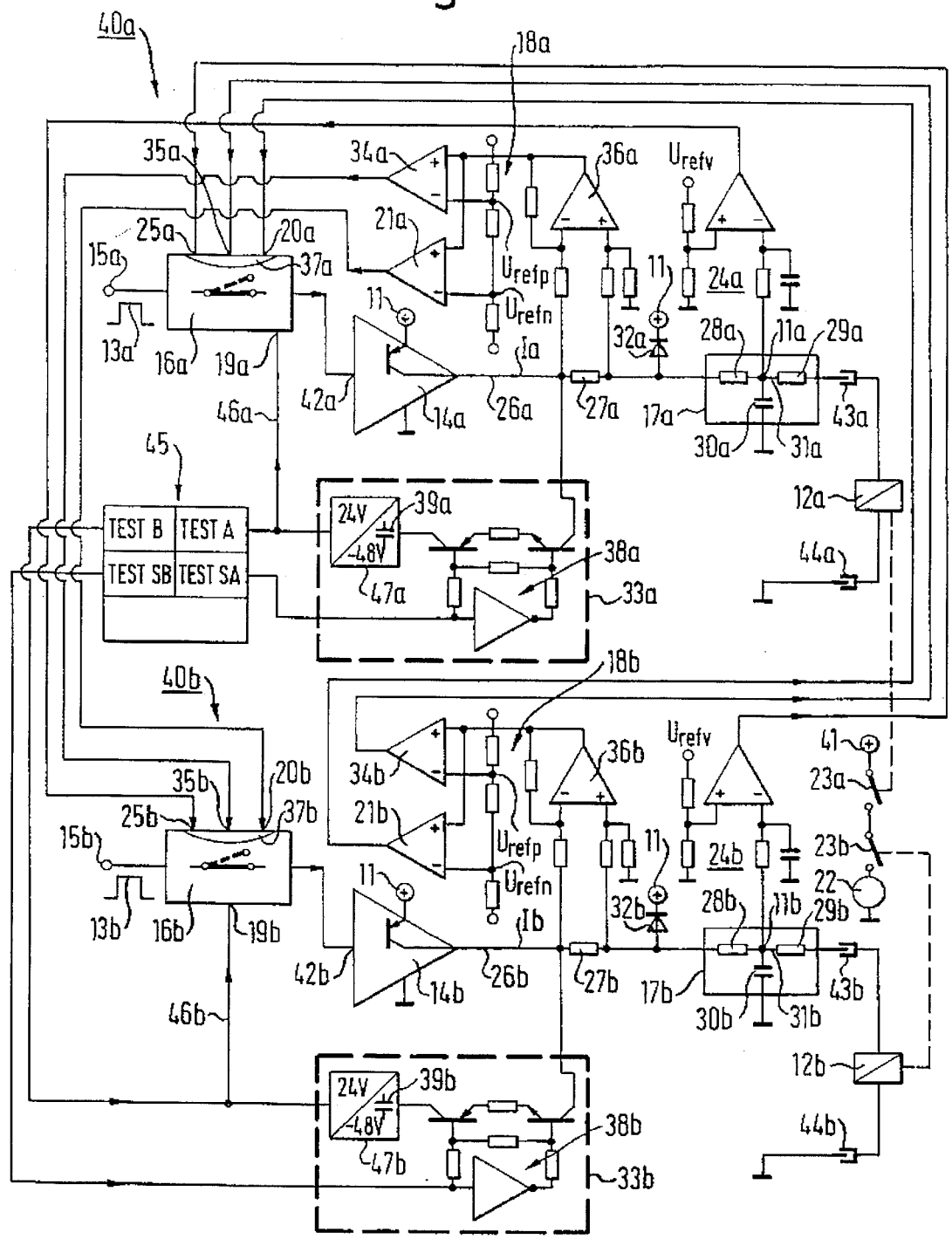
FIG. 1 a block circuit diagram of a safety switching arrangement in accordance with the invention, FIG. 2 a pulse/time diagram of the different switching stages in FIG. 1 with fault-free operation, and FIG. 3 a corresponding pulse/time diagram to that of FIG. 2 but on assuming an interruption error in the suppressor diode.

The safety switching arrangement of the invention comprises two switching paths 40a, 40b connected in parallel the sensor signal inputs 15a, 15b of which each receive an identical sensor switching signal 13a, 13b. The sensor switching signal may, for example, originate from a light barrier which is arranged in front of a dangerous working machine 22 in order to transmit the sensor switching signal 13a, 13b to the sensor signal inputs 15a, 15b when an operator enters into the light barrier beam, whereupon the dangerous working machine should be switched off. In the illustrated embodiment this takes place in that the drive of the working machine 22 is connected in series with a power supply 41 via two relay contacts 23a, 23b, with the one contact 23a being acted on by a relay 12a provided at the output of the switching path 40a and with the other switching contact 23b being acted on by a relay 12b provided at the output of the other switching path. The two contacts 23a, 23b are closing contacts, that is to say they close when the relay 12a, 12b, which can also be termed actors or actuators, are supplied with power, i.e. are active.

One recognizes that an operation of the working apparatus or the working machine 22 is only then possible when both relay contacts 23a and 23b are closed, i.e. both relays 12a and 12b are supplied with power. If only one of the switching contacts 23a or 23b is opened then the working machine 22 will be stopped.

The sensor signal inputs 15a, 15b are applied via a respective controlled semiconductor auxiliary switch 16a, 16b to the control input 42a, 42b of a semiconductor main switch 14a, 14b which, in the case of the presence of the control signal at the control input 42a, 42b applies a power supply 11 to the ground relay 12a, 12b via an output line 26a, 26b, an output resistor 27a, 27b and a low pass filter 17a, 17b. The relays 12a, 12b can also be located outside of the actual safety switching arrangement and be connected to the safety switching arrangement by plug contacts 43a, 43b and 44a, 44b respectively.

A test generator 45 belongs to both switching paths 40a, 40b and triggers a test cycle every 16 ms and in each case generates a test pause which lasts for 50 μs on each of the switching paths 40a and 40b respectively with a time offset of 8 ms.

The test generator 45 acts via control lines 46a, 46b on a first control input 19a, 19b of the auxiliary switches 16a, 16b in order to open these auxiliary switches 16a, 16b at the start of the respectively associated test pause. The opening of the auxiliary switches 16a, 16b corresponds to a zero signal at the sensor signal input so that in response to it, the attached main switch 14a, 14b must open.

In order to now examine whether the main switch 14a, 14b is actually open, an operational amplifier 36a, 36b is connected to the output resistor 27a, 27b and delivers at its output a signal representative for the potential at the output resistor 27a, 27b, i.e. also delivers a signal corresponding current Ia, Ib on the output line 26a, 26b. This signal is in each case applied to the control input of a comparator 21a, 21b, with a fixed reference voltage Urefn being supplied to the reference input of each comparator 21a, 21b. The dimensioning of the reference voltage Urefn is such that, on falling short of the lowest load current present when the main switch 14a, 14b is switched on, the comparator 21a, 21b at the output adopts the L level which, on being applied to respective second control inputs 20b, 20a of the respective auxiliary switches 16b, 16a, causes the latter to persist, in the closed state. If, however, the load current on the output line 26a, 26b is maintained, for example because of the through-alloyed (i.e. overheated and failed) main switch 14a or 14b then the output of the comparators 21a, 21b adopts the O level which signals to the respective other auxiliary switches 16b or 16a via the control input 20b, 20a that the relevant main switch 14a or 14b is not in order, whereupon the auxiliary switch 16b or 16a opens and remains in this state.

It is important that the output of the comparator 21a is connected with the second control input 20b of the auxiliary switch 16b and that the output of the comparator 21b is connected with the second control input 20a of the first auxiliary switch 16a, so that an error in the one switching path, for example 40a causes the opening of the other switching path, for example 40b.

The comparator 21a and operational amplifier 36a, and comparator 21b and operational amplifier 36b, together form respective output current measuring stages 18a, 18b with a threshold which permits a distinction between the normal load current present on switching on of the main switch 14a, 14b and an interrupted current.

The low pass filters 17a, 17b inserted into the output line 26a, 26b after the output resistors 27a, 27b each consist of two inductors 28a, 29a and 28b, 29b connected in series, with the respective connection line 31a, 31b between the two inductors being connected to an earthed capacitor 30a, 30b respectively. Each of the low pass filters 17a, 17b is directly arranged in front of the respectively associated positive output terminal 43a, 43b so that both the coupling in and also the coupling out of high frequency disturbing radiation is effectively avoided.

An output voltage measuring stage 24a, 24b is furthermore connected to the connection line 31a, 31b of each low pass filter 17a, 17b and contains a comparator which receives a reference voltage Urefv applied to the reference input, with the reference voltage Urefv specifying a voltage threshold of, for example, 3 V.

If the actually measured voltage Ua, Ub lies above 3 V then the output of the comparator of the respective switching stage 24a, 24b adopts the zero level. The output of the comparator 24a is supplied to a third control input 20b of the second main switch 16b, whereas the output of the comparator of the switching stage 24b is supplied to a third control input 25a of the first auxiliary switch 16a. With an O level at the output of the switching stages 24a, 24b the respective other auxiliary switch 16b or 16a respectively is held in the closed state.

If a potential greater than 3 V is determined during the test pause by the output voltage measuring stage 24a, 24b on the output line 26a, 26b, the other auxiliary switch 16b, 16b is opened, whereby the working machine 22 is switched off.

A suppressor diode 32a, 32b is in each case inserted between the voltage supply 11 and the output line section between the output resistor 27a, 27b and the low pass filter 17a, 17b and is intended to lead away disturbing pulses coupled in via the output sockets 43a, 43b which are dangerous for the main switches 14a, 14b. This is important because such disturbing pulses frequently occur simultaneously and could in such a case lead to through-alloying of both main switches.

Whereas through-alloying of the suppressor diodes 32a, 32b is already detected by the previously described test circuits, a measure must also be provided for the case that the suppressor diodes 32a, 32b are interrupted or one of their connection wires breaks.

For this purpose, a further shorter test SA, SB is provided within the test pause which is likewise controlled by the test generator 45. First of all the test generator 45 generates in the second part of the test pause a test current in the following manner:

During the first part of the test pause, a capacitor 39a, 39b within a test current source 33a, 33b is already charged up by a power supply 47a, 47b.

During the test pause in the test SA, SB this capacitor 39a, 39b is in each case transfer charged via a charge pump 38a, 38b. During this a test current flows via the suppressor diode 32a, 32b and the output resistor 27a, 27b and indeed in the opposite direction to the load current Ia, Ib, which can be recognized by a test current comparator 34a, 34b to the reference input of which a reference voltage Urefp is supplied. In so far as the suppressor diode 32a, 32b is intact and a predetermined test current flows an L level appears at the output of the comparator 34a, 34b as a result of a suitably selected reference voltage Urefp and signals to the other respective auxiliary switch 16b or 16a via a fourth control input 35b or 35a respectively, that the suppressor diode 32a, 32b is in order. The relevant auxiliary switch 16b, 16a is thus kept closed.

If one of these suppressor diodes 32a, 32b is interrupted, the intended test current does not flow and an O level arises at the output of the respective comparators 34a, 34b, whereby a corresponding error is signaled to the attached other auxiliary switch 16b or 16a respectively and the relevant auxiliary switch is permanently opened and the working machine 22 is thus permanently stopped.

Since the load current test with the switched off main switch 14a, 14b is carried out during the entire test pause and the suppression diode test is carried out in the test pause section which has for example been shortened to ¼, it is necessary, not only for the two control signals appearing at the inputs 20a, 35a and 20b, 35b respectively, but also for the control signals at the inputs 25a, 25b to be connected via an AND logic 37a, 37b so that the auxiliary switch 16a, 16b is then closed and only then remains closed when an L level appears at the output of all comparators 21a, 24a, 34a and 21b, 24b, 34b respectively.

As a result of the single short opening of the main switch 14a, 14b defined in accordance with the invention during a cycle preset by the test generator 45 a check is therefore also made of:

- whether the main switches 14a, 14b can be opened or whether both main switches 14a, 14b are opened before initiating an endangering state which corresponds to setting the working machine 22 in operation,
- whether the output lines 26a, 26b to be checked are free of foreign potentials, in that the potentials on the output lines 26a, 26b are measured while the respective main switch 14a, 14b is opened,
- whether the output lines 26a, 26b are free of cross-connections to one another, i.e. are mutually insulated, for which the time offset testing of the two switching off paths 14a, 14b is required, and
- whether the operation of the overpotential protection networks, i.e. of the suppressor diodes 32a, 32b is present in that a potential surge of a defined height and energy is applied to the suppressor diodes and the test current which is hereby produced is measured.

It is thus of particular importance for the invention that the described tests A/SA and B/SB take place with a clear time offset, i.e. in that the switch-off path 40a is in normal operation when a rapid test is carried out in the switch-off path 40b and vice versa.

On the occurrence of a negative test result (error in one of the switching paths 40a or 40b) the non-faulty switching path 40b or 40a respectively is permanently switched off. The working apparatus or the working machine 22 is thus switched off on the occurrence of a first error at the end of the current test cycle, so that no endangering state is any longer present. The renewed switching on of the working apparatus 22 and the renewed occurrence of the endangering state is made impossible until the fault which has arisen has been alleviated.

As a result of the test cycle preset by the test generator 45 the latent fault time is restricted to the test interval or to the test pause. Administrative measures with respect to the checking of the switching paths 40a, 40b or the dependencies of the working cycles of the machine are avoided. As a result of the defined test interval the residual risk with respect to the preclusion of faults is minimised, since the test is now forced periodically and does not take place more or less arbitrarily.

All the faults which touch on safety and in the same way wiring errors during installation are uncovered by the test circuits of the invention. Mechanical wear is avoided as a result of the use of semiconductor components.

The test generator 45 contains a time base independent from the attached sensor from which the test periods test A, test SA and test B, test SB can be derived. The test duration, number of test pulses per period, duration of the period and time offset from test A/SA to test B/SB can be preselected in accordance with the existing safety problem.

A test pause of 50 µs expediently takes place for each respective switching path 40a, 40b every 16 ms, with the test pauses being executed with a respective time offset to each other of 8 ms.

The comparators 24a, 24b on the one hand and 21a, 21b on the other hand operate redundantly with respect to the switching state of the respective main switch. It is important that the redundant information can in each case be formed independently of the load current via the comparators 21a, 21b or directly out of the voltage level on the output line on the switching stage 24a, 24b. This redundancy is, on the one hand, utilised to increase safety, whereas on the other hand, faults such as line breakages can be clearly distinguished from foreign voltage effects.

For the levels of the individual signals the following conventions are observed:

Sensor signal:

O level=stop L level=freeing of the output

Test switch off of the output via the control input 19a, 19b:

O level=test inactive

L level=test switch-off is taking place

Voltage level at the output of the output voltage measuring stage:

O level=Ua>3 V

L level=Ua<3 V

Output of the comparators 34a, 34b during test S:

O level=fault

L level=suppressor diode 32a, 32b in order

Output comparator 21a, 21b:

O level=load current greater than minimum load current

L level=load current smaller than minimum load current

Control signal for main switch 14a, 14b:

O level=switch open

L level=switch closed.

Before the first release signal a check should be made whether the other respective switching path 40a, 40b indicates the safe state (free of voltage and current). Likewise the over-voltage protection networks are to be checked for their operation.

As can be seen from the accompanying FIG. 1 the results of the individual tests of a switching path 40a, 40b are respectively supplied to the main switch 16b, 16a of the other switching path 40b, 40a. If a feature to be checked for the one switching path 40a, 40b is not satisfied the other switching part 40b, 40a is or remains latched. Only with a positive test result are the two outputs freed by the L level of the sensor signal.

The low pass filter 17a, 17b is to be so dimensioned that during the second test for checking the suppressor diodes 32a, 32b by means of the test current source 33a, 33b the actors 12a, 12b are effectively decoupled. Thus the low pass filter 17a, 17b ensures that the transfer charging current delivered by the test current source 33a, 33b is directed via the suppressor diode 32a, 32b since the low pass filter 17a, 17b is so dimensioned that it blocks off the transfer charging current from the attached actor 12a, 12b.

Figure 2:
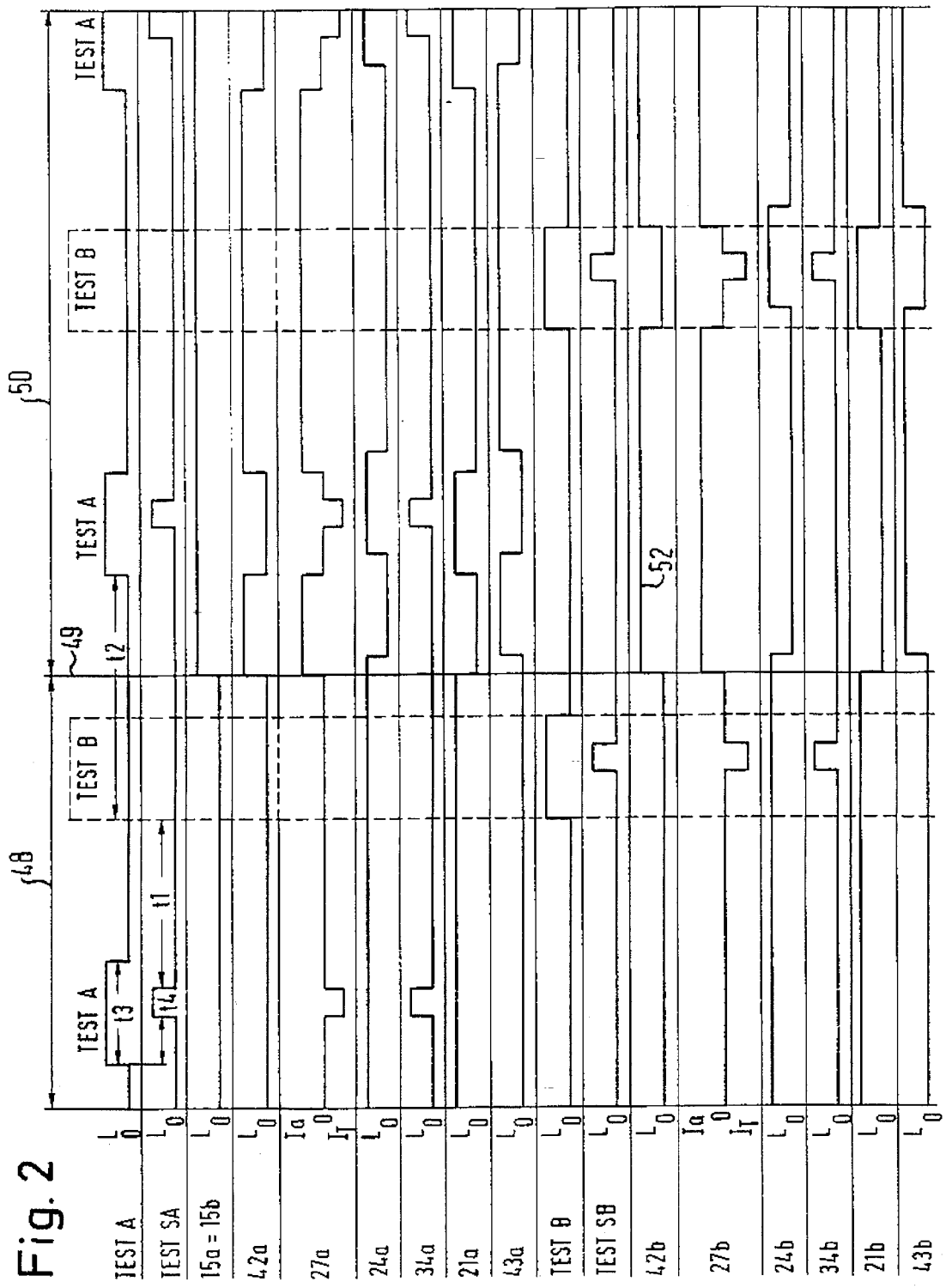

In FIG. 2 the various pulse time diagrams are reproduced at the points characterised at the start of each diagram with reference numerals or letters. During the time period 48 an O signal is present at both signal inputs 15a, 15b which likewise has the consequence, via the auxiliary switch 16a, of an O signal at the control input 42a of the main switch 14a. Accordingly an O signal is also present at the output terminal 43a and the relay 12a is not activated. During a time t3 of 50 μs the test generator 45 generates an L signal. Within this so defined test pause t3 the test generator 25 passes a further test pulse to the test current source 33a which has been shortened by a substantially shorter time t4 relative to the time t3. During the test SA the test current IT flows through the test resistor 27a, which in turn likewise has the consequence of an L signal at the output of the comparator 34a likewise with a time duration t4.

Since however the working machine 22 is in any event switched off through inactivation of the relay 12a the test A/SA has no effect on the output.

After a time t1 of for example 8 ms the test B begins in fully corresponding manner.

It is now assumed that at a time point 49 an L signal, that is to say a release signal, is applied to the sensor inputs 15a, 15b from the light barrier. This also leads to an L signal at the control input 42a and furthermore has the consequence of the level changes which are evident from the diagram of FIG. 2 at the individual positions of the switching arrangement. If now, after a time t2 of for example 8 ms, a test A is carried out then this would have an O signal as a consequence at the control input 42a which briefly switches off the main switch 14a, i.e. for the time t3. During the test SA carried out during the time t3 the test current IT then flows for a short time against the initially present output current Ia.

In each case an L signal is present at the outputs of the comparators 34a, 21a and 24a since a fault is nowhere present.

At the output 43a an O signal likewise arises for a short time which is not however sufficient, because of its brevity, for the deactivation of the relay 12a.

In any event the auxiliary switch 16b of the path 40b remains closed because no fault is announced.

In the diagram of FIG. 3 a fault F of the suppressor diode 32a is assumed which leads to the negative test current IT which flows in the fault-free state dropping out during the test SA.

Through an appropriate logic connection of the auxiliary switches 16a, 16b this fault of the negative test pulse IT can already be used to cause the auxiliary switch 16b to enter into the open state so that, on the appearance of an L signal at the sensor inputs 15a, 15b, and despite the closing of the main switch 14a which then occurs (see the signal at the control input 42a), the main switch 14b remains switched off (see the signal remaining at O at the control input 42b which—as indicated at 51—is in contrast to the fault-free state (see 52 in FIG. 2, remains at zero).

Even if the auxiliary switch 16b should not be opened during the stop time 48 then it is opened at the latest when the fault F occurs during the release time 50 during the test SA since in that way the negative test current IT in the resistor 27a drops, which signifies that the AND condition is no longer satisfied at the inputs 20b, 25b, 35b of the switching path 40b since only two inputs 20b, 25b receive an L signal, the input 35b however in contrast receives an O signal.

The working machine 22 thus remains permanently switched off until the fault F has been removed.

I claim:

1. A safety switching arrangement for operating a working apparatus comprising:

first and second actuators for jointly actuating the working apparatus;

a power supply operatively coupled to the first and second actuators for supplying power to the first and second actuators;

first and second main switches coupled in series between the first and second actuators, respectively, and the power supply, the main switches each being movable between open and closed positions;

first and second sensor signal inputs for receiving signals to move the first and second main switches into the open and closed positions;

a controllable auxiliary switch coupled in series between each main switch and the first and second sensor signal inputs, respectively, each auxiliary switch being movable between open and closed positions;

a test generator coupled to each auxiliary switch and having control inputs for providing a test pause at regular intervals wherein the associated auxiliary and main switches are opened during the test pause, the intervals of the test pauses associated with each auxiliary switch being offset from each other; and a test circuit for determining, during the test pause, whether the main switch associated with the respective auxiliary switch is open, the other auxiliary switch being opened when the main switch associated with said respective auxiliary switch remains closed during the test pause.

2. The arrangement of claim 1 the main switches and the auxiliary switches are controlled semiconductor switches.

3. The arrangement of claim 1 wherein the test pause is operated at a test frequency in the range of 10 to 100 Hz.

4. The arrangement of claim 1 wherein the test pause is less than 200 us.

5. The arrangement of claim 1 wherein the test pause is in the range of 30 to 70 us.

6. The arrangement of claim 1 further comprising a low pass filter connected in series between each main switch and the associated actuator.

7. The arrangement of claim 1 further comprising a suppressor diode coupled between the power supply and each main switch for minimizing disturbing pulses from the test generator to each main switch.

8. A safety switching arrangement for operating a working apparatus comprising:

first and second actuators for jointly operating the working apparatus;

a power supply operatively coupled to the first and second actuators for supplying power to the first and second actuators;

first and second main switches coupled in series between the first and second actuators, respectively, and the power supply, the main switches each being movable between open and closed positions;

first and second sensor signal inputs for receiving signals to move the first and second main switches into the open and closed positions;

a controllable auxiliary switch coupled in series between each main switch and the first and second sensor signal inputs, respectively, each auxiliary switch being movable between open and closed positions;

a test generator coupled to each auxiliary switch at first control inputs for providing a test pause at regular intervals wherein the associated auxiliary and main switches are opened during the test pause, the intervals of the test pauses associated with each auxiliary switch being offset from each other;

a test circuit for determining, during the test pause, whether the main switch associated with the respective auxiliary switch is open, the other auxiliary switch being opened when the main switch associated with said respective auxiliary switch remains closed during the test pause; and an output current measuring stage at each main switch and having an output coupled to a second control input of the auxiliary switch associated with the other main switch, each output current measuring stage having a switching stage with a threshold representing a minimum load current at an output of the main switch in the closed position, the output current measuring stage closing the auxiliary switch associated with the other main switch when the threshold current is exceeded during the test pause.

9. The arrangement of claim 8 further comprising an output voltage measuring stage at each main switch and having an output coupled to a third control input of the auxiliary switch associated with the other main switch, the output voltage measuring stage having a threshold voltage representative of a maximum output voltage when the main switch is closed, the output voltage measuring stage closing the auxiliary switch associated with the other main switch when the threshold voltage is exceeded during the test pause.

10. The arrangement of claim 9 wherein the output voltage measuring stage is coupled to the output line of the output current measuring stage.

11. The arrangement of claim 9 further comprising a low pass filter connected in series between each main switch and the associated actuator, the low pass filters being connected to the output line of the output current measuring stage.

12. The arrangement of claim 11 wherein each low pass filter comprises first and second inductors connected in series and a grounded capacitor connected between the inductors, the output voltage measuring stage being connected between the inductors.

13. The arrangement of claim 8 further comprising an output resistor coupled to the output line of the output current measuring stage.

14. The arrangement of claim 13 further comprising a suppressor diode coupled between the power supply and each main switch for minimizing disturbing pulses from the test generator to each main switch, the suppressor diodes each being coupled to the output line of the output current measuring stage after the output resistor.

15. The arrangement of claim 14 further comprising a second test circuit associated with each suppressor diode and coupled to the test generator for testing operation of the suppressor diodes during the test pause.

16. The arrangement of claim 15 wherein each second test circuit is activated for a second test pause during the first test pause for the associated auxiliary switch, the second test pauses being shorter than the first test pauses.

17. The arrangement of claim 16 wherein the second test circuits each comprise a test current source triggered by the test generator and an intact suppressor diode, the test current source applying a potential during the second test pause for generating a predetermined test current, the second test circuits each comprising a test current measurement stage having a threshold current for testing the suppressor diodes.

18. The arrangement of claim 17 wherein the predetermined test current is measured from the output of the output current measuring stage, the second test circuits further comprising a switching stage having a threshold current representative of a minimum permissible test current, each second test circuit closing the auxiliary switch associated with the other test circuit when the threshold current is exceeded.

19. The arrangement of claim 18 wherein the output current measuring stage comprises a plurality of comparators and operational amplifiers.

20. The arrangement of claim 19 wherein the output current measuring stage comprises switching stages for the test current and a load current.

21. The arrangement of claim 20 furthering comprising a logic AND circuit coupling the switching stages to each other.

22. The arrangement of claim 17 wherein the test current source comprises a charging pump and a reversible charge capacitor.

23. A safety switching arrangement for operating a working apparatus comprising:

first and second actuators for jointly actuating the working apparatus;

a power supply operatively coupled to the first and second actuators for supplying power to the first and second actuators;

first and second main switches coupled in series between the first and second actuators, respectively, and the power supply, the main switches each being movable between open and closed positions;

first and second sensor signal inputs for receiving signals to move the first and second main switches into the open and closed positions;

a controllable auxiliary switch coupled in series between each main switch and the first and second sensor signal inputs, respectively, each auxiliary switch being movable between open and closed positions;

a test generator coupled to each auxiliary switch at first control inputs for providing a test pause at regular intervals wherein the associated auxiliary and main switches are opened during the test pause, the intervals of the test pauses associated with each auxiliary switch being offset from each other;

a test circuit for determining, during the test pause, whether the main switch associated with the respective auxiliary switch is open, the other auxiliary switch being opened when the main switch associated with said respective auxiliary switch remains closed during the test pause; and a low pass filter connected in series between each main switch and the associated actuator, each low pass filter comprising first and second inductors connected in series and a grounded capacitor connected between the inductors.

* * * * *